(12) United States Patent
Choi

(10) Patent No.: US 12,508,333 B2
(45) Date of Patent: Dec. 30, 2025

(54) ULTRAVIOLET STERILIZER

(71) Applicant: Haenim Co., Ltd., Incheon (KR)

(72) Inventor: Heung Bae Choi, Incheon (KR)

(73) Assignee: Haenim Co., Ltd., Seo-Gu (KR)

( * ) Notice: Subject to any disclaimer, the term of this patent is extended or adjusted under 35 U.S.C. 154(b) by 481 days.

(21) Appl. No.: 18/063,422

(22) Filed: Dec. 8, 2022

(65) Prior Publication Data

US 2023/0241266 A1 Aug. 3, 2023

(30) Foreign Application Priority Data

Feb. 3, 2022 (KR) .................. 10-2022-0013941

(51) Int. Cl.
*A61L 2/10* (2006.01)
(52) U.S. Cl.
CPC ............. *A61L 2/10* (2013.01); *A61L 2202/11* (2013.01); *A61L 2202/122* (2013.01)
(58) Field of Classification Search
CPC .......... A61L 2/10; A61L 2/24; A61L 2202/11; A61L 2202/122; A61L 2202/117; A61L 2202/17; A61L 2202/23; A61L 2202/14
See application file for complete search history.

(56) References Cited

FOREIGN PATENT DOCUMENTS

| KR | 20-2010-0009485 | | 9/2010 | | |
|----|----|----|----|----|----|
| KR | 20180032902 A | * | 9/2016 | | |
| KR | 10-1906230 | | 10/2018 | | |
| KR | 10-2019-0109938 | | 9/2019 | | |
| KR | 10-2336122 | | 9/2019 | | |
| KR | 20190109938 A | * | 9/2019 | ............... | A61L 2/26 |
| KR | 102133348 | | 7/2020 | | |
| KR | 20200113460 A | * | 10/2020 | ............... | A61L 9/20 |
| KR | 10-2219686 | | 2/2021 | | |
| KR | 10-2021-0041725 | | 4/2021 | | |

* cited by examiner

*Primary Examiner* — David E Smith

(74) *Attorney, Agent, or Firm* — Yancy IP Law, PLLC

(57) ABSTRACT

The present disclosure provides an ultraviolet sterilizer including a housing having an internal space configured to accommodate a sterilization target and a rack configured to support the sterilization target, the housing having an open front side through which the sterilization target and the rack are loaded into or unloaded from the internal space, and including a door configured to open or close the front side, a water receptacle configured to be loaded into or unloaded from the internal space through the front side, the water receptacle being placed on a bottom of the internal space and configured to receive water falling from the sterilization target, an ultraviolet emitting unit installed on the water receptacle and configured to emit ultraviolet rays to the sterilization target placed on the rack, a wireless power receiver installed in the water receptacle and configured to receive power in a wireless manner and supply the power to the ultraviolet emitting unit, and a wireless power transmitter installed on the bottom and configured to transmit power to the wireless power receiver in a wireless manner.

7 Claims, 5 Drawing Sheets

ULTRAVIOLET STERILIZER

FIELD

The present disclosure relates to an ultraviolet sterilizer, and more particularly, to an ultraviolet sterilizer in which an ultraviolet emitting unit is installed on a water receptacle configured to receive water falling from a sterilization target, and power is supplied to the ultraviolet emitting unit in a wireless manner.

DESCRIPTION OF THE RELATED ART

An ultraviolet sterilizer refers to a device for sterilizing and disinfecting products such as dishes and nursing bottles (hereinafter, referred to as a "sterilization target") by using ultraviolet rays. It is known that ultraviolet sterilization is advantageous in comparison with drug sterilization and heating sterilization because the ultraviolet sterilization does not deform the sterilization target while generating no environmental hormone.

Korean Patent No. 10-1906230 (Nursing Bottle Sterilizer) discloses a nursing bottle sterilizer that is one of the types of ultraviolet sterilizers. The nursing bottle sterilizer has an ultraviolet lamp installed on a ceiling of a housing configured to accommodate nursing bottles, and the ultraviolet lamp emits ultraviolet rays to the nursing bottle while rotating.

Korean Patent No. 10-2219686 (Nursing Bottle Sterilizer) also discloses a nursing bottle sterilizer that is one of the types of ultraviolet sterilizers. The nursing bottle sterilizer has an ultraviolet LED installed on a ceiling of a housing configured to accommodate nursing bottles, and an ultraviolet LED is also installed on a sidewall of the housing. The ultraviolet LED on the ceiling of the housing emits ultraviolet rays to the nursing bottle while rotating, and the ultraviolet LED on the sidewall of the housing emits ultraviolet rays to the nursing bottle in a state in which the ultraviolet LED is fixed.

In the case of the nursing bottle sterilizers disclosed in the above-mentioned two patent documents, the ultraviolet lamp or the ultraviolet LED, which emits ultraviolet rays to the nursing bottle, is installed on the ceiling of the housing or both the ceiling and the sidewall of the housing. In this case, there may occur a problem in that only some of the nursing bottles in the housing are exposed to the ultraviolet rays, but the remaining nursing bottles cannot be sterilized.

To solve the problem, Korean Patent No. 10-2336122 (Electric Sterilizer) and Korean Patent Application Laid-Open No. 10-2019-0109938 (Electric Sterilizer) disclose ultraviolet sterilizers in which ultraviolet lamps or ultraviolet LEDs are installed on ceilings and bottoms of housings.

DOCUMENTS OF RELATED ART

Patent Documents

Korean Patent No. 10-1906230 (Nursing Bottle Sterilizer)
Korean Patent No. 10-2219686 (Nursing Bottle Sterilizer)
Korean Patent No. 10-2336122 (Electric Sterilizer)
Korean Patent Application Laid-Open No. 10-2019-0109938 (Electric Sterilizer)

SUMMARY

Immediately after being washed with water, a sterilization target is typically placed on a rack in the housing and sterilized by ultraviolet rays. For this reason, water remaining on the sterilization target placed on the rack falls onto the bottom of the housing, and a stain is often left on the bottom of the housing. For this reason, a user needs to frequently clean the bottom of the housing. However, in the case of the electric sterilizers disclosed in Korean Patent No. 10-2336122 (Electric Sterilizer) and Korean Patent Application Laid-Open No. 10-2019-0109938 (Electric Sterilizer), the user cannot withdraw the bottom of the housing, which makes it very difficult to clean the bottom of the housing. In addition, because an ultraviolet emitting unit (the ultraviolet lamp or the ultraviolet LED) Is Installed "n th' bottom of the housing that cannot be withdrawn, it is also very difficult to perform maintenance on the ultraviolet emitting unit.

Meanwhile, some ultraviolet sterilizers use water receptacles for receiving water falling from the sterilization targets. Because the water receptacle is simply placed on the bottom of the housing and used, the user may easily withdraw the water receptacle from the housing, clean the water receptacle, and then place the water receptacle on the bottom of the housing. Further, the water receptacle is mainly made of metal (stainless steel) to maintain a clean external appearance and prevent rust. However, in the case of the electric sterilizers disclosed in Korean Patent No. 10-2336122 (Electric Sterilizer) and Korean Patent Application Laid-Open No. 10-2019-0109938 (Electric Sterilizer), the ultraviolet rays emitted from the ultraviolet emitting unit installed on the bottom of the housing are blocked by the water receptacle and cannot be emitted to the sterilization target. For this reason, there is a problem in that the water receptacle cannot be used.

Accordingly, an object of the present disclosure is to provide an ultraviolet sterilizer capable of making it easy to remove a stain caused by water dropped from a sterilization target, positioning an ultraviolet emitting unit below the sterilization target, and making it easy to perform maintenance on the ultraviolet emitting unit.

The present disclosure provides an ultraviolet sterilizer including: a housing having an internal space configured to accommodate a sterilization target and a rack configured to support the sterilization target, the housing having an open front side through which the sterilization target and the rack are loaded into or unloaded from the internal space, and including a door configured to open or close the front side; a water receptacle configured to be loaded into or unloaded from the Internal space through the front side, the water receptacle being placed on a bottom of the internal space and configured to receive water falling from the sterilization target; an ultraviolet emitting unit installed on the water receptacle and configured to emit ultraviolet rays to the sterilization target placed on the rack; a wireless power receiver installed in the water receptacle and configured to receive power in a wireless manner and supply the power to the ultraviolet emitting unit; and a wireless power transmitter installed on the bottom and configured to transmit power to the wireless power receiver in a wireless manner.

The water receptacle may include: an upper plate having an installation hole in which the ultraviolet emitting unit is installed; and a lower plate configured to surround an installation space, in which the wireless power receiver is installed, together with the upper plate. In this case, a portion of the bottom for covering the wireless power transmitter and the lower plate may be made of plastic to allow transmission and reception of wireless power.

The upper plate may include: an outer plate made of metal and configured to receive water falling from the sterilization target; and an inner plate made of plastic and having an upper surface bonded to a lower surface of the outer plate. In this case, the lower plate may be separably coupled to the inner plate.

A sealing gasket may be interposed between a rim of the lower plate and a rim of the outer plate when the lower plate and the inner plate are coupled. In addition, the wireless power receiver may be fixed to a lower surface of the inner plate and electrically connected to the ultraviolet emitting unit.

The ultraviolet emitting unit may include: a watertight body installed in the installation hole so as to ensure watertightness; a light transmission cap configured to penetrate the watertight body while being tightly fitted with the watertight body, the light transmission cap being made of a material capable of transmitting ultraviolet rays and having an upper surface exposed to the internal space; a bracket including a support member positioned in the installation space, provided to be in contact with a lower end of the watertight body and a lower end of the light transmission cap, and separably coupled to the upper plate, and a protruding member protruding upward from the support member and inserted into the light transmission cap; and a printed circuit board fixed to an upper surface of the protruding member and having an ultraviolet LED mounted thereon, the printed circuit board being electrically connected to the wireless power receiver.

An O-ring may be interposed between an inner surface of the light transmission cap and an outer surface of the protruding member.

A Hall sensor may be provided on the wireless power transmitter, a magnet may be provided on the water receptacle, and the magnet may face the Hall sensor when the water receptacle is placed on the bottom. In this case, the wireless power transmitter may transmit wireless power only when the Hall sensor detects a magnetic force of the magnet.

According to the present disclosure, a stain caused by water falling from the sterilization target is formed on the water receptacle that may be withdrawn from the internal space of the housing. Therefore, the stain may be easily removed. Further, the ultraviolet emitting unit is installed on the water receptacle positioned below the sterilization target and operated by power received and transmitted in a wireless manner. Therefore, the ultraviolet rays may be emitted from below the sterilization target, and the maintenance may be easily performed on the ultraviolet emitting unit.

In addition, according to the present disclosure, the upper plates of the water receptacle are configured such that the inner plate made of plastic is bonded to the outer plate made of metal. Further, the lower plate of the water receptacle is separably coupled to the inner plate. Therefore, the external appearance of the outer plate is clean and aesthetic, and the water receptacle is easily assembled or disassembled.

In addition, according to the present disclosure, the sealing gasket is interposed between the rim of the lower plate and the rim of the upper plate of the water receptacle, which makes it possible to ensure watertightness of the installation space positioned in the water receptacle.

In addition, according to the present disclosure, both the wireless power receiver and the ultraviolet emitting unit are installed on the upper plate and connected by the electric wire, which makes it possible to easily handle the lower plate without the restriction of the electric wire at the time of assembling or disassembling the lower plate.

In addition, according to the present disclosure, the ultraviolet emitting unit is separably installed in the installation hole of the upper plate, which makes it easy to perform maintenance on the ultraviolet emitting unit. Further, the ultraviolet emitting unit includes the watertight body, which makes it possible to ensure watertightness in the installation hole.

In addition, according to the present disclosure, the printed circuit board and the ultraviolet LED of the ultraviolet emitting unit may be positioned in the watertight space assuredly sealed by the O-ring.

In addition, according to the present disclosure, the Hall sensor and the magnet are used to detect whether the water receptacle is placed on the bottom of the housing, and only in case that the water receptacle is placed on the bottom of the housing, the wireless power transmitter transmits wireless power. Therefore, it is possible to assuredly prevent an unexpected accident.

DETAILED DESCRIPTION OF THE EMBODIMENT

Figure 1:
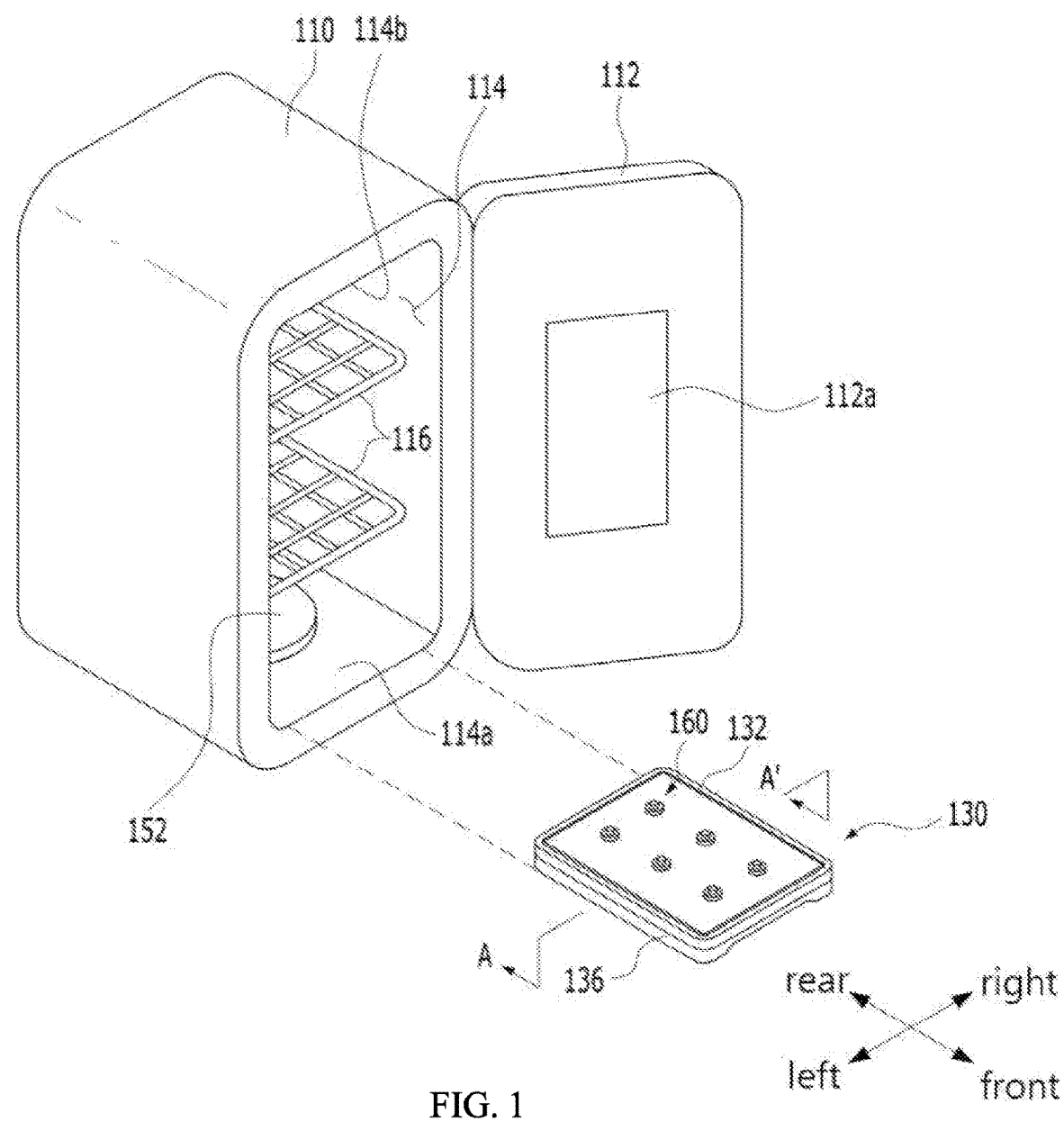
FIG. 1 is a perspective view illustrating an ultraviolet sterilizer according to the present disclosure.

Hereinafter, exemplary embodiments of an ultraviolet sterilizer according to the present disclosure will be described in detail with reference to the drawings. Terms or words used herein should not be interpreted as being limited to a general or dictionary meaning and should be interpreted as a meaning and a concept which conform to the technical spirit of the present disclosure based on a principle that an inventor can appropriately define a concept of a term in order to describe his/her own invention by the best method.

An ultraviolet sterilizer 100 according to the present disclosure serves to sterilize a sterilization target such as dishes and nursing bottles by using ultraviolet rays and includes a housing 110, a water receptacle 130, ultraviolet emitting units 160, a wireless power receiver 140, and a wireless power transmitter 150.

The housing 110 defines an overall external appearance of the ultraviolet sterilizer 100 and has an internal space 114 surrounded by a bottom 114a, a ceiling 114b, left and right walls, and a rear wall. A front side of the housing 110 is opened. In addition, the housing 110 has a door 112 configured to open or close the front side. The door 112 may have a transparent window 112a so that a user may observe the internal space 114. In addition, cradles (not illustrated) are provided on the left and right walls of the internal space 114, and left and right ends of racks 116 each provided in the form of a grille are mounted on the cradles. The sterilization targets and the racks 116 may be accommodated in the internal space 114 of the housing 110. The sterilization targets and the racks 116 may be loaded into or unloaded from the internal space 114 through the open front side of the housing 110.

The water receptacle 130 may be loaded into or unloaded from the internal space 114 through the front side of the housing 110. Further, the water receptacle 130 is accommodated in the internal space 114 by being placed on the bottom 114a and serves to receive water falling from the sterilization target. Therefore, a stain caused by water falling from the sterilization target is formed on the water receptacle 130. The user may withdraw the water receptacle 130 from the internal space 114 and easily remove the stain.

The ultraviolet emitting unit 160 serves to emit ultraviolet rays toward the sterilization target placed on the rack 116 and is installed on the water receptacle 130. FIG. 1 illustrates an example in which six ultraviolet emitting units 160 are installed on the water receptacle 130. The wireless power receiver 140 serves to receive power in a wireless manner and supply the power to the ultraviolet emitting units 160. The wireless power receiver 140 is also installed on the water receptacle 130. The exemplary structures of the water receptacle 130, the ultraviolet emitting unit 160, and the wireless power receiver 140 will be described below with reference to FIGS. 2 to 4.

Figure 2:
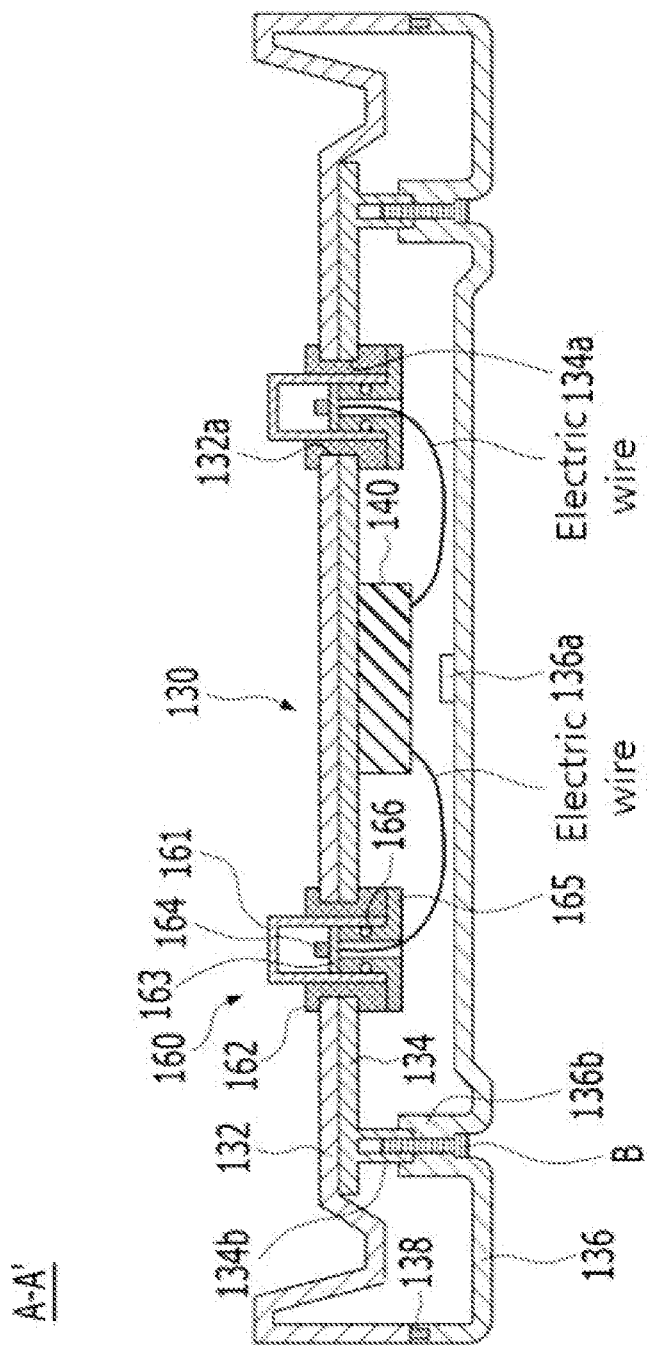
FIG. 2 is a cross-sectional view taken along line A-A' in FIG. 1.

As illustrated in FIG. 2, the water receptacle 130 includes upper plates 132 and 134 and a lower plate 136. Further, the upper plates 132 and 134 include an outer plate 132 and an inner plate 134.

The outer plate 132 of the upper plates 132 and 134 is a member that receives water falling from the sterilization target. The outer plate 132 is positioned at an uppermost side of the water receptacle 130. The outer plate 132 is made of metal such as stainless steel to maintain a clean external appearance and prevent rust. The outer plate 132 has installation holes 132a in which the ultraviolet emitting units 160 are installed. The installation holes 132a are equal in number to the ultraviolet emitting units 160. For example, as illustrated in FIG. 1, six installation holes 132a are provided in the outer plate 132 in case that the number of ultraviolet emitting units 160 is six.

Figure 3:
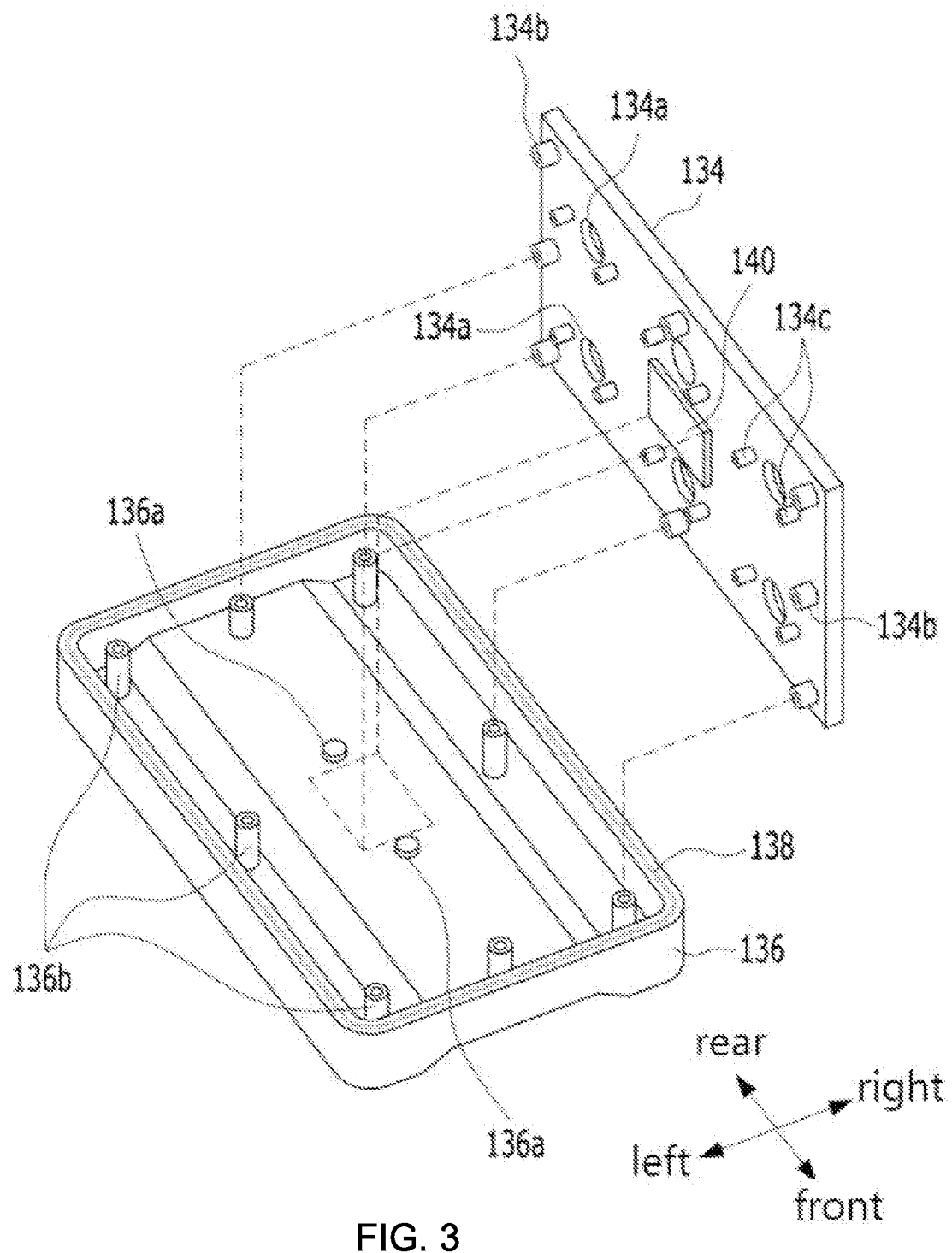
FIG. 3 is an exploded perspective view illustrating a lower plate and an inner plate of upper plates that constitute a water receptacle illustrated in FIG. 1.

The inner plate 134 of the upper plates 132 and 134 has a slightly smaller size than the outer plate 132. The inner plate 134 has an upper surface bonded to a lower surface of the outer plate 132 by a bonding agent. Further, the inner plate 134 also has installation holes 134a in which the ultraviolet emitting units 160 are installed. When the inner plate 134 is bonded to the outer plate 132, the installation holes 134a of the inner plate 134 communicate with the installation holes 132a of the outer plate 132. In addition, as illustrated in FIGS. 2 and 3, a plurality of lower plate bolting fastening members 134b and a plurality of pairs of ultraviolet emitting unit bolting fastening members 134c are integrally formed on a lower surface of the inner plate 134. The lower plate bolting fastening members 134b are arranged along a rim of the inner plate 134. Two ultraviolet emitting unit bolting fastening members 134c, which are paired together, are positioned at two opposite sides of the installation hole 134a. FIG. 2 illustrates eight lower plate bolting fastening members 134b and six pairs of ultraviolet emitting unit bolting fastening members 134c. The inner plate 134 is made of plastic and manufactured by injection molding.

A method of manufacturing the bolt fastening members 134b and 134c using a metallic material and welding the bolt fastening members 134b and 134c to the lower surface of the outer plate 132 may be considered. However, in this case, because welding marks are also left on the upper surface of the outer plate 132, which causes a problem in that an external appearance of the outer plate 132 is not clean. Further, there is a problem in that it is very difficult to manufacture the outer plate 132. Therefore, as described above, the inner plate 134 integrated with the bolt fastening members 134b and 134c may be manufactured by injection molding, and then the inner plate 134 may be bonded to the outer plate 132.

The lower plate 136 of the water receptacle 130 is a member that surrounds an installation space 131 together with the upper plates 132 and 134. As illustrated in FIGS. 2 and 3, inner plate bolting fastening members 136b are integrally formed on an upper surface of the lower plate 136. When bolts B are fastened in a state in which the inner plate bolting fastening members 136b and the lower plate bolting fastening members 134b are in contact with one another, the lower plate 136 is separably coupled to the inner plate 134 of the upper plates 132 and 134. Further, when the coupling is implemented, a rim of the lower plate 136 and a rim of the outer plate 132 of the upper plates 132 and 134 are in contact with each other. In this case, a sealing gasket 138 is interposed between the rim of the lower plate 135 and the rim of the outer plate 132 to ensure watertightness of the installation space 131. The lower plate 136 is made of plastic to allow the transmission and reception of wireless power and manufactured by injection molding.

The wireless power receiver 140 is installed in the water receptacle 130 and positioned in the installation space 131. For example, as illustrated in FIGS. 2 and 3, the wireless power receiver 140 may be fixed to the lower surface of the inner plate 134 of the upper plates 132 and 134 by bonding or the like. A printed circuit board may be used as the wireless power receiver 140. An antenna circuit pattern may be printed on the printed circuit board, and other necessary electronic elements may be mounted on the printed circuit board. In addition, the wireless power receiver 140 is connected to the ultraviolet emitting units 160 through electric wires.

The wireless power receiver 140 may be fixed to the upper surface of the lower plate 136. In case that the wireless power receiver 140 is fixed to the lower surface of the inner plate 134 as described above, the electric wires do not restrict the lower plate 136, and the lower plate 136 may be easily handled at the time of assembling or disassembling the lower plate 136. In contrast, in case that the wireless power receiver 140 is fixed to the upper surface of the lower plate 136, the electric wires restrict the lower plate 136, which makes it difficult to handle the lower plate 136 at the time of assembling or disassembling the lower plate 136. Therefore, the wireless power receiver 140 may be fixed to the lower surface of the inner plate 134.

Figure 4:
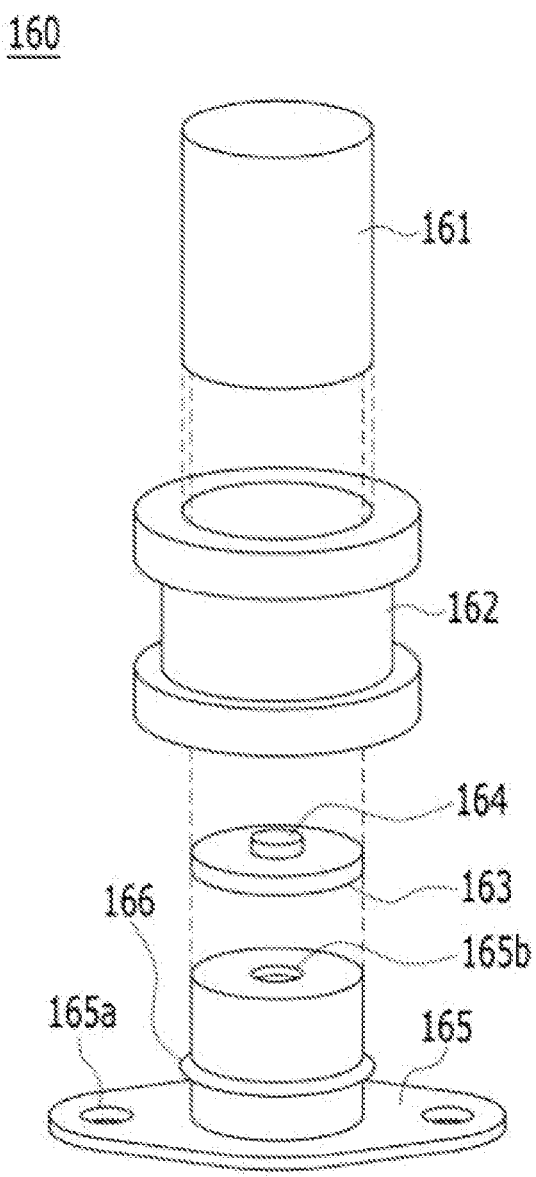
FIG. 4 is an exploded perspective view illustrating an ultraviolet emitting unit illustrated in FIG. 1.

As illustrated in FIGS. 2 and 4, the ultraviolet emitting units 160 may each include a watertight body 162, a light transmission cap 161, a bracket 165, and a printed circuit board 163.

The light transmission cap 161 is provided in the form of a hollow cap and made of a material (e.g., quartz glass) capable of transmitting ultraviolet rays.

The bracket 165 includes a support member provided in the form of a flat plate, and a protruding member protruding upward from an approximately center of the support member. A pair of bolt holes 165a is formed in the support member. Further, the protruding member has a hollow portion.

The printed circuit board 163 is fixed to an upper surface of the protruding member of the bracket 165 by a bonding agent. Further, an ultraviolet LED 164 is mounted on the printed circuit board 163. An electric wire extending from the printed circuit board 163 is connected to the wireless power receiver 140 while passing through the hollow portion of the protruding member. When power is supplied from the wireless power receiver 140 to the printed circuit board 163 through the electric wire, the ultraviolet LED 164 operates and emits ultraviolet rays.

When the protruding member is inserted into the light transmission cap 161 until the support member comes into contact with a lower end of the light transmission cap 161, the bracket 165 to which the printed circuit board 163 is fixed is coupled to the light transmission cap 161. Further, when the bracket 165 and the light transmission cap 161 are coupled as described above, the printed circuit board 163 and the ultraviolet LED 164 are positioned in the light transmission cap 161. Therefore, the ultraviolet rays emitted from the ultraviolet LED 164 pass through the light transmission cap 161. Meanwhile, to ensure the watertightness of the printed circuit board 163 and the ultraviolet LED 164, an O-ring 166 is interposed between an outer surface of the protruding member and an inner surface of the light transmission cap 161.

The watertight body 162 is fitted into the installation holes 132a and 134a of the upper plates 132 and 134 and installed to be caught by the upper surface of the outer plate 132 and the lower surface of the inner plate 134. Further, the watertight body 162 has a hollow portion. The watertight body 162 is made of a watertight material such as silicone or rubber to ensure the watertightness in the installation holes 132a and 134a.

In the state in which the bracket 165 and the light transmission cap 161 are coupled and the watertight body 162 is installed in the installation holes 132a and 134a, the light transmission cap 161 penetrates the watertight body 162 while being tightly fitted with the hollow portion of the watertight body 162 until the support member of the bracket 165 comes into contact with the lower end of the watertight body 162. Thereafter, when bolts (not illustrated) passing through the bolt holes 165a of the support member are fastened to the ultraviolet emitting unit bolting fastening members 134c (see FIG. 3) formed on the lower surface of the inner plate 134, the ultraviolet emitting unit 160 is separably installed on the upper plates 132 and 134.

Further, when the ultraviolet emitting unit 160 is installed as described above, gaps between inner surfaces of the installation holes 132a and 134a and the outer surface of the light transmission cap 161 are sealed by the watertight body 162, and the upper surface of the light transmission cap 161 is exposed to the internal space 114 of the housing 110, such that the ultraviolet rays passing through the light transmission cap 161 are emitted to the sterilization target positioned in the internal space 114 of the housing 110.

Figure 5:
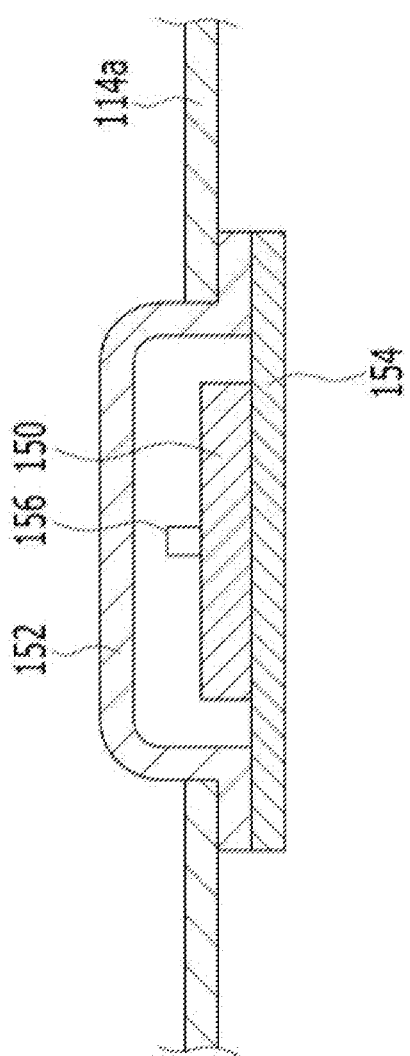
FIG. 5 is a cross-sectional view illustrating a wireless power transmitter illustrated in FIG. 1.

Meanwhile, the wireless power transmitter 150 serves to transmit power to the wireless power receiver 140 in a wireless manner and is installed on the bottom 114a of the housing 110. In this case, as illustrated in FIG. 5, a hole is formed in the bottom 114a of the housing 110, and the wireless power transmitter 150 is positioned below a cover 152 that is made of plastic and covers the hole. If the wireless power transmitter 150 is positioned below the bottom 114a made of metal, wireless power cannot be transmitted. Therefore, as described above, the wireless power transmitter 150 is positioned below the cover 152 made of plastic. A support plate 154 is coupled to the plastic cover 152 and supports the wireless power transmitter 150. Further, when the water receptacle 130 is placed on the bottom 114a of the housing 110, the wireless power transmitter 150 and the wireless power receiver 140 are positioned to face each other. A printed circuit board may be used as the wireless power transmitter 150. An antenna circuit pattern may be printed on the printed circuit board, and other necessary electronic elements may be mounted on the printed circuit board.

In the ultraviolet sterilizer 100 described above, a Hall sensor 156 may be provided on the wireless power transmitter 150. A magnet 136a may be provided on the water receptacle 130. The magnet 136a may face the Hall sensor 156 when the water receptacle 130 is placed on the bottom 114a of the housing 110. For example, as illustrated in FIG. 5, the Hall sensor 156 is mounted on the wireless power transmitter 150 configured as a printed circuit board. Further, as illustrated in FIG. 3, the magnet 136a is fixed to the upper surface of the lower plate 136 of the water receptacle 130. In this case, the wireless power transmitter 150 is configured to transmit wireless power only when the Hall sensor 156 detects a magnetic force of the magnet 136a even though the user operates a power button and operates the ultraviolet sterilizer 100. Otherwise, the wireless power transmitter 150 does not transmit wireless power.

The user may, intentionally or by mistake, operates the ultraviolet sterilizer 100 without inserting the water receptacle 130 into the internal space 114 of the housing 110 or operates the ultraviolet sterilizer 100 after inserting another water receptacle made of metal into the internal space 114 instead of inserting the water receptacle 130. If the wireless power transmitter 150 transmits wireless power even in this case, an unexpected accident may occur. In particular, an explosion accident may occur in case that another water receptacle made of metal is inserted into the internal space 114. Therefore, in the present disclosure, the Hall sensor 156 and the magnet 136a are used to detect whether the water receptacle 130 is placed on the bottom 114a of the housing 110, and only in case that the water receptacle 130 is placed on the bottom 114a of the housing 110, the wireless power transmitter 150 transmits wireless power. Therefore, it is possible to assuredly prevent an unexpected accident.

Meanwhile, in the ultraviolet sterilizer 100 according to the present disclosure, the ultraviolet emitting unit (the ultraviolet lamp or the ultraviolet LED) may be installed on the ceiling 114b of the housing 110 or installed on the ceiling 114b and the sidewall of the housing 110. In this case, the ultraviolet emitting unit installed on the ceiling 114b or the sidewall may adopt a different structure from the ultraviolet emitting unit 160 installed on the water receptacle 130.

The present disclosure has been described with reference to the limited exemplary embodiments and the drawings, but the present disclosure is not limited thereto. The described exemplary embodiments may be variously changed or modified by those skilled in the art to which the present disclosure pertains within the technical spirit of the present disclosure and within the scope equivalent to the appended claims, and the above-described exemplary embodiments may of course be variously combined.

What is claimed is:

1. An ultraviolet sterilizer comprising:
  a housing having an internal space configured to accommodate a sterilization target and a rack configured to support the sterilization target, the housing having an open front side through which the sterilization target and the rack are loaded into or unloaded from the internal space, and including a door configured to open or close the front side;
  a water receptacle configured to be loaded into or unloaded from the internal space through the front side, the water receptacle being placed on a bottom of the internal space and configured to receive water falling from the sterilization target;

an ultraviolet emitting unit installed on the water receptacle and configured to emit ultraviolet rays to the sterilization target placed on the rack;

a wireless power receiver installed in the water receptacle and configured to receive power in a wireless manner and supply the power to the ultraviolet emitting unit; and a wireless power transmitter installed on the bottom and configured to transmit power to the wireless power receiver in a wireless manner;

wherein the water receptacle comprises:

an upper plate having an installation hole in which the ultraviolet emitting unit is installed; and a lower plate configured to surround an installation space, in which the wireless power receiver is installed, together with the upper plate, and wherein a portion of the bottom for covering the wireless power transmitter and the lower plate are made of plastic to allow transmission and reception of wireless power.

2. The ultraviolet sterilizer of claim 1, wherein the upper plate comprises:

an outer plate made of metal and configured to receive water falling from the sterilization target; and an inner plate made of plastic and having an upper surface bonded to a lower surface of the outer plate, and wherein the lower plate is separably coupled to the inner plate.

3. The ultraviolet sterilizer of claim 2, wherein a sealing gasket is interposed between a rim of the lower plate and a rim of the outer plate when the lower plate and the inner plate are coupled.

4. The ultraviolet sterilizer of claim 2, wherein the wireless power receiver is fixed to a lower surface of the inner plate and electrically connected to the ultraviolet emitting unit.

5. The ultraviolet sterilizer of claim 1, wherein the ultraviolet emitting unit comprises:

a watertight body installed in the installation hole so as to ensure watertightness;

a light transmission cap configured to penetrate the watertight body while being tightly fitted with the watertight body, the light transmission cap being made of a material capable of transmitting ultraviolet rays and having an upper surface exposed to the internal space;

a bracket including a support member positioned in the installation space, provided to be in contact with a lower end of the watertight body and a lower end of the light transmission cap, and separably coupled to the upper plate, and a protruding member protruding upward from the support member and inserted into the light transmission cap; and a printed circuit board fixed to an upper surface of the protruding member and having an ultraviolet LED mounted thereon, the printed circuit board being electrically connected to the wireless power receiver.

6. The ultraviolet sterilizer of claim 5, wherein an O-ring is interposed between an inner surface of the light transmission cap and an outer surface of the protruding member.

7. The ultraviolet sterilizer of claim 1, wherein a Hall sensor is provided on the wireless power transmitter, a magnet is provided on the water receptacle, the magnet faces the Hall sensor when the water receptacle is placed on the bottom, and the wireless power transmitter transmits wireless power only when the Hall sensor detects a magnetic force of the magnet.

* * * * *